(12) United States Patent
Schlaak et al.

(10) Patent No.: US 6,639,325 B1
(45) Date of Patent: Oct. 28, 2003

(54) MICROELECTROMECHANIC RELAY AND METHOD FOR THE PRODUCTION THEREOF

(75) Inventors: Helmut Schlaak, Ober-Ramstadt (DE); Martin Hanke, Berlin (DE)

(73) Assignee: Tyco Electronics Logistics AG (CH)

( * ) Notice: Subject to any disclaimer, the term of this patent is extended or adjusted under 35 U.S.C. 154(b) by 0 days.

(21) Appl. No.: 10/049,260

(22) PCT Filed: Jul. 28, 2000

(86) PCT No.: PCT/EP00/07316

§ 371 (c)(1),
(2), (4) Date: Jun. 26, 2002

(87) PCT Pub. No.: WO01/09911

PCT Pub. Date: Feb. 8, 2001

(30) Foreign Application Priority Data

Jul. 29, 1999 (DE) .......................... 199 35 819

(51) Int. Cl.[7] .................................... H01L 23/48
(52) U.S. Cl. .................. 257/780; 257/781; 257/254
(58) Field of Search ................ 257/780, 781, 257/254; 200/181, 245; 335/78, 80; 337/139

(56) References Cited

U.S. PATENT DOCUMENTS

| | | | |
|---|---|---|---|
| 5,463,233 A | 10/1995 | Norling | |
| 5,629,565 A | 5/1997 | Schlaak et al. | |
| 5,673,785 A | 10/1997 | Schlaak et al. | |
| 5,889,452 A | 3/1999 | Vuilleumier | |
| 6,057,520 A | * | 5/2000 | Goodwin-Johansson .... 200/181 |
| 6,094,116 A | * | 7/2000 | Tai et al. ....................... 335/78 |
| 6,384,707 B2 | * | 5/2002 | Minners ....................... 337/139 |

FOREIGN PATENT DOCUMENTS

DE    4205029    2/1993

* cited by examiner

Primary Examiner—David Nelms
Assistant Examiner—Thinh T. Nguyen
(74) Attorney, Agent, or Firm—Baker & Daniels

(57) ABSTRACT

The invention relates to a relay, especially a miniaturized electrostatic relay, comprising a bridge-type make contact. The contact spring is designed as a torsion spring that is linked with a switching spring (3) via multiply bent spring parts (7). It is thus possible in particular to compensate fixed contacts (2) of different heights. The invention further relates to a method for producing the relay as a micromechanical electrostatic relay.

20 Claims, 2 Drawing Sheets

MICROELECTROMECHANIC RELAY AND METHOD FOR THE PRODUCTION THEREOF

The invention relates to a relay, in particular a microrelay, comprising a bridge-type make contact. In addition thereto, the invention relates to a method of making the relay.

The document DE 44 37 261 C1 discloses a micro-relay adapted to be produced micromechanically, consisting of an etched-free silicon spring tongue, which is pre-curved, and of a planar counter-electrode. The spring tongue constitutes a wedge-shaped capacitor together with the counter-electrode. By application of a control voltage between spring tongue and planar counter-electrode, the spring tongue is stretched until the free spring end touches the working contact on the counter-electrode. During the switching operation, the curved spring tongue rolls on the counter-electrode and thus forms a migrating wedge.

In addition to relays having a single closer or make contact function, in which the load current to be switched is conducted in a conductive track on the movable spring, there are desirable relays in which a make contact constitutes a bridging contact across two fixed contacts. The bridge-type make contact offers higher voltage strength and, in case of high-frequency load current signals, a lower crosstalk capacity and thus higher frequency response. However, with bridge-type make contacts, there is the problem that the fixed contacts may be subject to wear to different extents, thereby making the switching strokes of the individual fixed contacts different from each other. The result of this is that there are different contact forces arising at the two fixed contacts. Strong wear on one side would have the effect that one contact in the end would no longer close at all.

For realizing a bridge-type make contact with the aid of the known micro-relay, the movable spring tongue would have a rectangular contact arranged thereon, covering two fixed counter-contacts. Such an arrangement has the disadvantage that different contact forces arise in case of different wear of the two juxtaposed fixed contacts. Due to the high torsional rigidity of the spring tongue, the bridge contact cannot adjust to counter-contacts of different heights. In case of a further increasing difference in height, one contact finally would no longer be closed at all.

It is thus the object of the present invention to make available a relay which is adapted to be miniaturized and which establishes safe bridging contact also in case of different heights of the fixed contacts. The invention furthermore relates to a method of making the micro-relay. This object is met according to the invention by a relay according to claim 1. Advantageous developments of the invention and a method of making the invention are indicated in the further claims.

The invention indicates a relay comprising a base member with two fixed contacts as well as a switching spring. The switching spring is attached by way of an edge portion along a mounting line and is movable between two positions, an open one and a closed one. In addition thereto, the switching spring has a contact spring. Arranged on the contact spring is a movable contact bridging the fixed contacts when the switching spring is in the closed position. Furthermore, the relay comprises a drive member moving the switching spring and the contact spring between the open and closed positions. The contact spring is in the form of a torsion spring that is rotatable about an axis of rotation. The axis of rotation is located in the plane of the contact spring in the middle between the two fixed contacts. The projection of the axis of rotation onto the base member intersects the connecting line of the fixed contacts substantially at right angles.

The effect achievable by the splitting of the relay spring into a contact spring and a switching spring, according to the invention, with the contact spring being in the form of a torsion spring, is that safe contact is guaranteed also with different heights of the fixed contacts. Due to the rotatability of the torsion spring about an axis of rotation between the fixed contacts, the movable contact can adjust to different heights of the fixed contacts. This is possible without impairing the switching behavior of the switching spring.

Especially easy miniaturization is obtained with a relay according to the invention in which the contact spring is part of the switching spring.

The contact spring, in particularly advantageous manner, can be made from the switching spring in that portions of the switching spring are etched away. Such a procedure in particular provides for the possibility of utilizing the patterning techniques known from silicon technology, with these being possibly transferred to a metallic switching spring.

A contact spring that is rotatable about an axis of rotation is attained in particularly simple and thus advantageous manner by providing a contact part and one or more spring parts in the contact spring. The contact part constitutes the carrier of the movable contact and extends transversely of the axis of rotation so as to cover the fixed contacts. This contact part is connected to the switching spring by one or more spring parts, with the spring parts being connected to the contact part in the region of the axis of rotation of the torsion spring. The effect achieved thereby is that the contact spring is a torsion spring and at the same time is resiliently coupled to the switching spring.

In addition thereto, a development of the relay according to the invention is particularly advantageous in which the shape of the spring parts follows multiply curved paths. Due to this extended spring path, it is possible in particularly simple manner to obtain an arbitrary low rigidity of the torsion spring, which facilitates tilting of the movable contact so as to abut on two fixed contacts of different heights.

Furthermore, it is particularly advantageous to arrange the spring parts on two opposite sides of the switching part, thereby ensuring that the axis of rotation is not tilted due to unilateral mounting of the contact part.

Moreover, it is particularly advantageous to design the relay in a manner in which the switching spring is attached to the base member and is curved away from the same. This renders possible the realization of a relay comprising a bridge contact with the initially indicated migrating wedge.

With this arrangement (with curved switching spring), it is particularly advantageous when the connecting line between the fixed contacts is parallel to the mounting line. Due to the fact that the switching spring, in case of a relay making use of the migrating wedge principle, is urged onto a counter-piece starting from the mounting line, the effect achieved by equal distances of the fixed contacts from the mounting line is that the movable contact contacts the fixed contacts almost simultaneously. For the same reason, such a relay employing this arrangement of the fixed contacts, at all times has the same contact distances between the fixed contacts and the movable contact.

It is particularly advantageous to choose an electrostatic drive as drive member for the relay. Such a drive consists in that a first electrode, arranged on the side of the switching spring facing the base member, and a second electrode, arranged on the base member opposite the first electrode, are connected to a dc voltage source. Such a drive requires energy for switching for short times only, whereas the closed position is fixed solely by electrostatic interaction, without necessitating the supply of additional energy.

In addition thereto, a relay is particularly advantageous in which the switching spring consists of silicon and the base member consists of silicon or glass. Such a relay can be realized easily with the structuring or patterning and manufacturing techniques known from silicon technology.

The invention furthermore indicates a method of making such a relay, comprising the following steps:

1. The second electrode and the fixed contacts are deposited on the base substrate constituting the base member and then are patterned.
2. Thereafter, an insulating layer is deposited on the second electrode.
3. A silicon wafer having a doped silicon layer on the side of the wafer facing the base substrate is bonded onto the base substrate.
4. Beginning from the side of the silicon wafer facing away from the doped silicon layer, said wafer is etched back, e.g. by KOH etching, until the doped silicon layer is left standing that is to form the switching spring.
5. Finally, by patterning of the doped silicon layer, the contact spring is formed from the switching spring or the switching spring itself is formed, respectively.

Such a method has the advantage that miniaturized relays can be manufactured very easily.

In the following, the invention will be elucidated in more detail by way of embodiments and the associated drawings.

Figure 1:
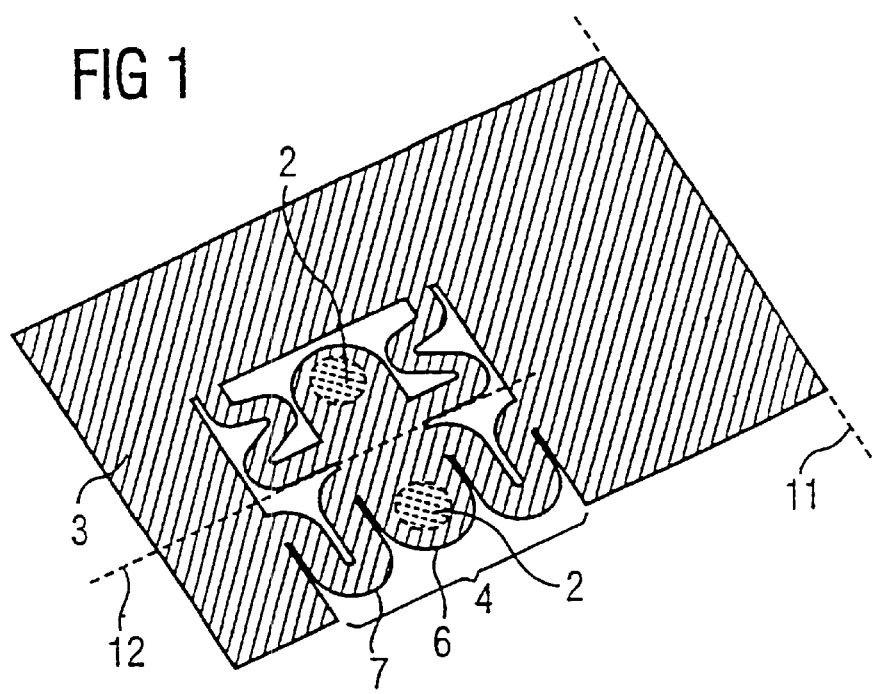
FIG. 1 shows the switching spring of a relay according to the invention, in which the connecting line of the fixed contacts extends parallel to the mounting line, in a schematic plan view.
Figure 3:
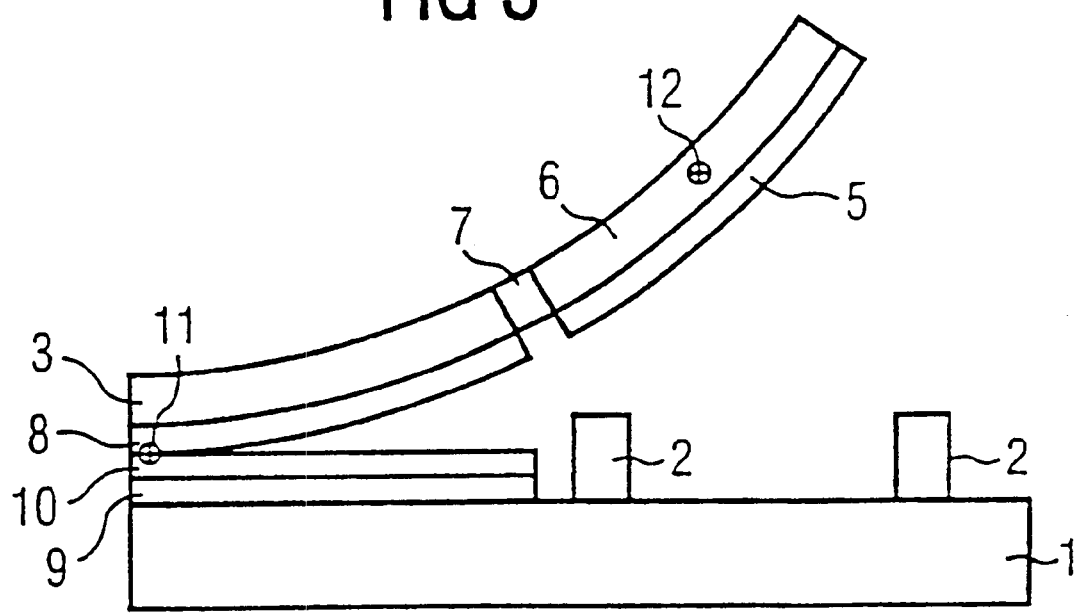
FIG. 3 shows a relay with migrating wedge according to the invention in the open state, in a schematic longitudinal sectional view.

FIG. 1 shows the switching spring 3 of a relay according to the invention, which is attached along mounting line 11. The switching spring 3 comprises a contact spring 4 consisting of a contact part 6 and spring parts 7. Spring parts 7, with respect to the shape thereof, follow multiply curved paths. The torsional rigidity may thus be adjusted to any desired low value. Starting from both sides of the contact part 6, the spring parts connected the latter to switching spring 3, thus ensuring that the axis of rotation 12 is not tilted due to unilateral mounting of contact part 6. On the bottom side of contact part 6, there is disposed the movable contact 5 (FIG. 3). The fixed contacts 2 of the base member, not shown, are arranged underneath contact part 6. Contact part 6 is rotatable about the axis of rotation 12. The axis of rotation 12 is perpendicular to the mounting line 11. The fixed contacts 2 are arranged underneath the contact part 6 on both sides of said axis of rotation 12.

Figure 2:
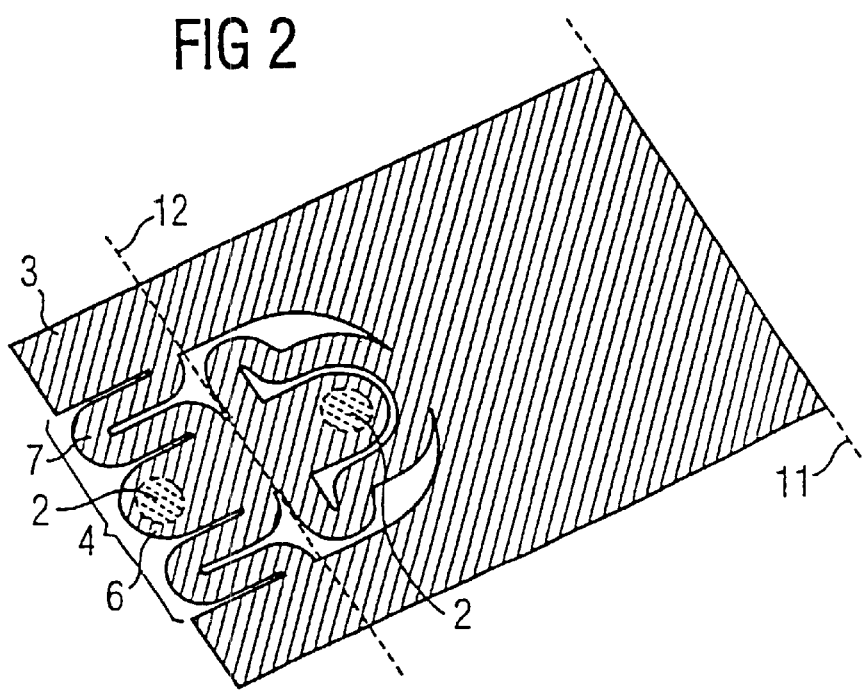
FIG. 2 shows the switching spring of a relay according to the invention, in which the connecting line of the fixed contacts is perpendicular to the mounting line, in a schematic plan view.

FIG. 2 shows the switching spring 3 of a relay according to the invention, which is attached along mounting line 11. Switching spring 3 has a contact spring 4 consisting of contact part 6 and spring parts 7. Spring parts 7, with respect to the shape thereof, follow multiply curved paths. The torsional rigidity may thus be adjusted to the desired low value. Starting from opposite sides of the contact part 6, the spring parts connect the latter to switching spring 3, thus ensuring that the axis of rotation 12 is not tilted due to unilateral mounting of contact part 6. On the bottom side of contact part 6, there is disposed the movable contact 5 (FIG. 3). The fixed contacts 2 are arranged underneath contact part 6. Contact part 6 is rotatable about the axis of rotation 12. The axis of rotation 12 is parallel to the mounting line 11. The fixed contacts are arranged underneath the contact part on both sides of said axis of rotation 12.

FIG. 3 shows a relay with migrating wedge, according the invention, in the open state. The migrating wedge is constituted of the base member 1 and the switching spring 3 which is curved away from the latter, but otherwise is formed identically as in FIG. 2. Arranged on the base member 1 are the fixed contacts 2 as well as the second electrode 9 having an insulating layer 10. The switching spring 3, on the left-hand edge thereof, is fixed connected to base member 1. The switching spring 3 comprises a first electrode 8 as well as the spring part 7 and the contact part 6 of the contact spring. Contact part 6 is rotatable about the axis of rotation 12. Furthermore, the contact part 6 has a movable contact 5 on its bottom side. The rotatable contact part 6 may easily adjust to fixed contacts 2 of different height and thus provide for safe contacting. In the present example, the fixed contacts 2 are arranged such that their connecting line is perpendicular to mounting line 11. This has the effect that, in closing the relay, contact is established first with the left-hand one and then with the right-hand one of the fixed contacts 2. In addition thereto, the contacting distance of the left-hand fixed contact 2 is at all times smaller than the contacting distance of the right-hand fixed contact 2 (except in the closed condition).

Figure 4:
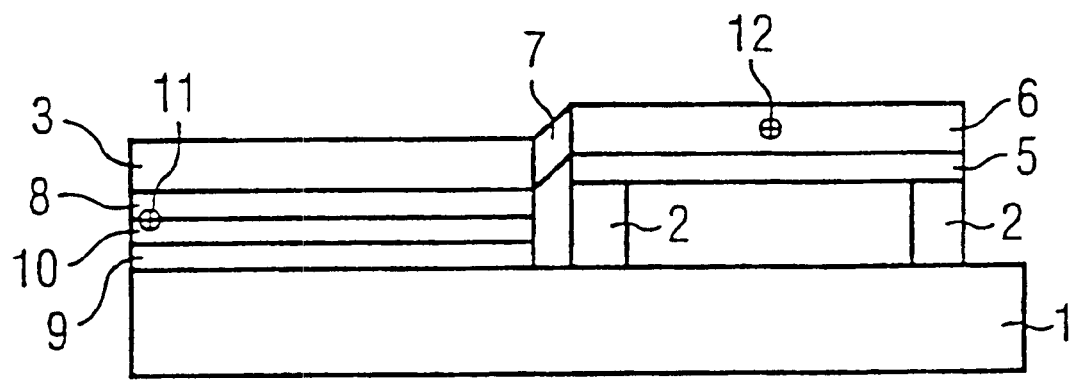
FIG. 4 shows a relay with migrating wedge according to the invention in the closed state, in a schematic longitudinal sectional view.

FIG. 4 illustrates the relay of FIG. 3 in the closed state. The switching spring 3 abuts on base member 1. The contact part 6, raised by way of switching spring 3, abuts the fixed contacts 2. The spring parts 7 connect the switching spring to the contact spring and establish the contacting force between movable contact 5 and fixed contacts 2.

The invention is not restricted to the embodiments shown in exemplary form, but is defined in its most general form by claim 1.

What is claimed is:

1. A relay, comprising:
   a base member having two fixed contacts,
   a switching spring attached by way of an edge portion along a mounting line, said switching spring being movable between open and closed positions and having a contact spring,
   a movable contact arranged on the contact spring and bridging the fixed contacts in the closed position of the switching spring,
   a drive member moving the switching spring and the contact spring between said open and closed positions,
   wherein said contact spring is designed as torsion spring that is rotatable about an axis of rotation arranged centrally and perpendicularly to the connecting line between the fixed contacts and located in the plane of the contact spring.
2. A relay according to claim 1, wherein said contact spring is part of said switching spring.
3. A relay according to claim 2, wherein the contact spring is manufactured by etching away portions of said switching spring.
4. A relay according to claim 2, wherein the contact spring consists of a contact part extending transversely to the axis of rotation, and of one or more spring parts connected both to the contact part and to the switching spring in the region of said axis of rotation.

5. A relay according to claim 4, wherein the configuration of the spring parts follows multiply curved paths.

6. A relay according to claim 4, wherein the spring parts start from opposite sides of the contact part.

7. A relay according to claim 1, wherein the switching spring is attached to the base member and is curved away from the same.

8. A relay according to claim 1, wherein the fixed contacts are arranged such that their connecting line is perpendicular to said mounting line.

9. A relay according to claim 1, wherein the fixed contacts are arranged such that their connecting line is parallel to said mounting line.

10. A relay according to claim 7, wherein the drive member comprises a first electrode arranged on the side of the switching spring facing the base member, a second electrode arranged on the base member opposite the first electrode, and a dc voltage source connected to the electrodes.

11. A relay according to claim 8, wherein the drive member comprises a first electrode arranged on the side of the switching spring facing the base member, a second electrode arranged on the base member opposite the first electrode, and a dc voltage source connected to the electrodes.

12. A relay according to claim 9, wherein the drive member comprises a first electrode arranged on the side of the switching spring facing the base member, a second electrode arranged on the base member opposite the first electrode, and a dc voltage source connected to the electrodes.

13. A relay according to claim 1, wherein said switching spring consists of silicon and said base member consists of silicon or glass.

14. A relay comprising a base member having two fixed contacts, where a switching spring is attached by way of an edge portion along a mounting line, said switching spring having a contact spring and being movable between open and closed positions, a movable contact arranged on the contact spring and bridging the fixed contacts in the closed position of the switching spring, a drive member moving the switching spring and the contact spring between said open and closed positions, said contact spring being profiled as a torsion spring linked to said switching spring via multiply bent spring sections.

15. A relay according to claim 14, wherein said torsion spring is rotatable about an axis of rotation arranged centrally and perpendicularly to the connecting line between the fixed contacts and located in the plane of the contact spring.

16. A relay comprising a base member having two fixed contacts, where a switching spring is attached by way of an edge portion along a mounting line, said switching spring having a contact spring, and said switching spring being movable between open and closed positions, a movable contact arranged on the contact spring and bridging the fixed contacts in the closed position of the switching spring, a drive member moving the switching spring and the contact spring between said open and closed positions, said contact spring having torsion spring means for compensating said contact spring to various heights of said fixed contacts.

17. A relay according to claim 16, wherein said contact spring is profiled as a torsion spring linked to said switching spring via multiply bent spring sections.

18. A relay according to claim 16, wherein said torsion spring means is rotatable about an axis of rotation arranged centrally and perpendicularly to the connecting line between the fixed contacts and located in the plane of the contact spring.

19. A relay according to claim 16, wherein the contact spring consists of a contact part extending transversely to an axis of rotation, and of one or more spring parts connected both to the contact part and to the switching spring in the region of said axis of rotation.

20. A method of making a relay, having a base member having two fixed contacts, a switching spring which is movable between open and closed positions and having a contact spring, a movable contact arranged on the contact spring and bridging the fixed contacts in the closed position of the switching spring, and a drive member comprising a first electrode arranged on the side of the switching spring facing the base member, and a second electrode arranged on the base member opposite the first electrode, the method of comprising the steps of:

a) depositing the second electrode, an overlying insulating layer and the fixed contacts on a base substrate constituting the base member, b) bonding a silicon wafer, having a doped silicon layer on the side of the wafer facing the base substrate, onto the base substrate, and c) patterning the doped silicon layer to form the switching spring and the contact spring.

* * * * *

UNITED STATES PATENT AND TRADEMARK OFFICE
CERTIFICATE OF CORRECTION

PATENT NO. : 6,639,325 B1
DATED : October 28, 2003
INVENTOR(S) : Helmut Schlaak et al.

It is certified that error appears in the above-identified patent and that said Letters Patent is hereby corrected as shown below:

<u>Column 5,</u>
Lines 5 and 47, delete "multiply" and insert -- multiple --

Signed and Sealed this

Thirtieth Day of December, 2003

JAMES E. ROGAN
*Director of the United States Patent and Trademark Office*